US009489028B2

(12) United States Patent
Khor et al.

(10) Patent No.: US 9,489,028 B2
(45) Date of Patent: Nov. 8, 2016

(54) MANAGING SIDEBAND SEGMENTS IN ON-DIE SYSTEM FABRIC (71) Applicant: Intel Corporation, Santa Clara, CA (US)

(72) Inventors: Hai Ming Khor, Bukit Mertajam (MY); Kay Keat Khoo, Bayan Lepas (MY); Vui Yong Liew, Bukit Mertajam (MY); Bhushan Vaidya, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 633 days.

(21) Appl. No.: 13/631,870

(22) Filed: Sep. 29, 2012

(65) Prior Publication Data

US 2013/0086398 A1    Apr. 4, 2013

(30) Foreign Application Priority Data

Sep. 30, 2011    (MY) ......................... PI 2011004721

(51) Int. Cl.
*H04L 12/24*       (2006.01)
*G06F 1/32*        (2006.01)
*G06F 15/78*       (2006.01)

(52) U.S. Cl.
CPC ........... *G06F 1/3206* (2013.01); *G06F 1/3287* (2013.01); *G06F 15/7825* (2013.01); *Y02B 60/1282* (2013.01)

(58) Field of Classification Search
CPC ....... H04L 67/10; H04L 47/12; H04B 1/525; H04B 10/299; G06F 1/3203; G06F 1/3287; G06F 1/3253
See application file for complete search history.

(56) References Cited

U.S. PATENT DOCUMENTS

| 6,009,488 A | 12/1999 | Kavipurapu |
| 6,179,486 B1 * | 1/2001 | Wallach et al. ............... 710/302 |
| 7,062,597 B2 | 6/2006 | Perego et al. |
| 2003/0208566 A1 | 11/2003 | Weber et al. |
| 2005/0283523 A1 | 12/2005 | Almeida et al. |
| 2007/0230344 A1* | 10/2007 | Hua et al. ..................... 370/235 |
| 2008/0144670 A1* | 6/2008 | Goossens et al. ............ 370/503 |
| 2008/0263282 A1 | 10/2008 | Harada et al. |
| 2009/0282226 A1 | 11/2009 | Hoover et al. |

(Continued)

FOREIGN PATENT DOCUMENTS

| CN | 1696921 A | 11/2005 |
| CN | 101069174 A | 11/2007 |
| WO | 2013/048960 A1 | 4/2013 |

OTHER PUBLICATIONS

International Preliminary Report on Patentability and Written Opinion received for PCT Patent Application No. PCT/US2012/056883, mailed on Apr. 10, 2014, 14 pages.

(Continued)

*Primary Examiner* — Mohammed Rehman
*Assistant Examiner* — Alyaa T Mazyad
(74) *Attorney, Agent, or Firm* — Alpine Technology Law Group LLC (57) ABSTRACT Methods and apparatus for managing sideband segments in an On-Die System Fabric (OSF) are described. In one embodiment, a sideband OSF includes a plurality of segments that may be reset or powered down independently after power management logic determines that in progress messages have been handled and future messages to the segment being reset or powered down will be blocked. Other embodiments are also disclosed.

20 Claims, 5 Drawing Sheets

(56) References Cited

U.S. PATENT DOCUMENTS

| | | |
|---|---|---|
| 2010/0054039 A1 | 3/2010 | Kim |
| 2010/0250889 A1 | 9/2010 | Fang et al. |
| 2011/0096659 A1* | 4/2011 | Cardona et al. ............... 370/220 |
| 2013/0073878 A1* | 3/2013 | Jayasimha ............ G06F 1/3287 713/300 |

OTHER PUBLICATIONS

International Search Report and Written Opinion received for PCT Patent Application No. PCT/US2012/056883, mailed on Mar. 4, 2013, 10 pages.

Extended European Search Report received for European Patent Application No. 12836528.5, mailed on Mar. 31, 2015, 10 pages.

Beigne, Edith, et al., "An Asynchronous Power Aware and Adaptive NoC Based Circuit", IEEE Journal of Solid-State Circuits, Apr. 2009, 11 pages, vol. 44, No. 4, IEEE Service Center, Piscataway, NJ.

Thonnart, Yvain, et al., "Automatic Power Regulation based on an Asynchronous Activity Detection and its Application to ANOC Node Leakage Reduction", Symposium, Apr. 7, 2008, 10 pages, IEEE, Piscataway, NJ.

Office Action received for Chinese Patent Application No. 201280047855.9, mailed on Sep. 28, 2015, 10 pages.

Office Action received for Chinese Patent Application No. 201280047855.9, mailed on May 23, 2016, 5 pages.

* cited by examiner

MANAGING SIDEBAND SEGMENTS IN ON-DIE SYSTEM FABRIC

CROSS REFERENCE TO RELATED APPLICATIONS

This application claims priority to Malaysian patent application PI2011004721 filed on Sep. 30, 2011 (which is incorporated herein by reference in its entirety).

FIELD

The present disclosure generally relates to the field of electronics. More particularly, an embodiment of the invention relates to techniques for managing sideband segments in an On-Die System Fabric (OSF).

BACKGROUND

An integrated circuit device may include various components. Subsets of these components may need to be reset and then powered down, e.g., due to power consumption considerations, errors, etc. However, resetting and then powering down any of the subsets in isolation may result in one or more of the remaining subsets to become nonoperational or error-prone, for example, when a message is in progress of being transferred between the subsets of components. Alternatively, if all the component subsets are reset and powered down at the same time, the design may lose flexibility, e.g., by losing the ability to maintain at least some of the integrated circuit device components operational at least partially.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

In some embodiments, an OSF sideband network may be segmented into a plurality of segments. Each of these segments may be located in a separate power domain. In an embodiment, there may be three power domains, which may be referred to as SUS (chipset suspend power domain, where power management controller resides), ASW (Auxiliary power domain, where chipset manageability engine resides.), and CORE (chipset core power domain, where chipset core logic is resides) (from deepest power domain to shallowest power domain). Every segment may include one or more OSF sideband router(s) (e.g., to route messages between various agents in the OSF) and endpoint(s) (e.g., agents in the OSF that transmit or receive message(s)). The endpoints may communicate with each other by sending messages that travel over point-to-point interface links through routers in the OSF. As discussed herein, "sideband" network, fabric, etc. generally refers to an interface for communicating out-of-band information, e.g., to eliminate special purpose wires that pose the biggest risk for reuse of circuitry blocks (such as Intellectual Property (IP) blocks) in different designs. Moreover, the sideband message interface may be used for status, power management, configuration shadowing, test modes, etc. in various embodiments.

Figure 1:
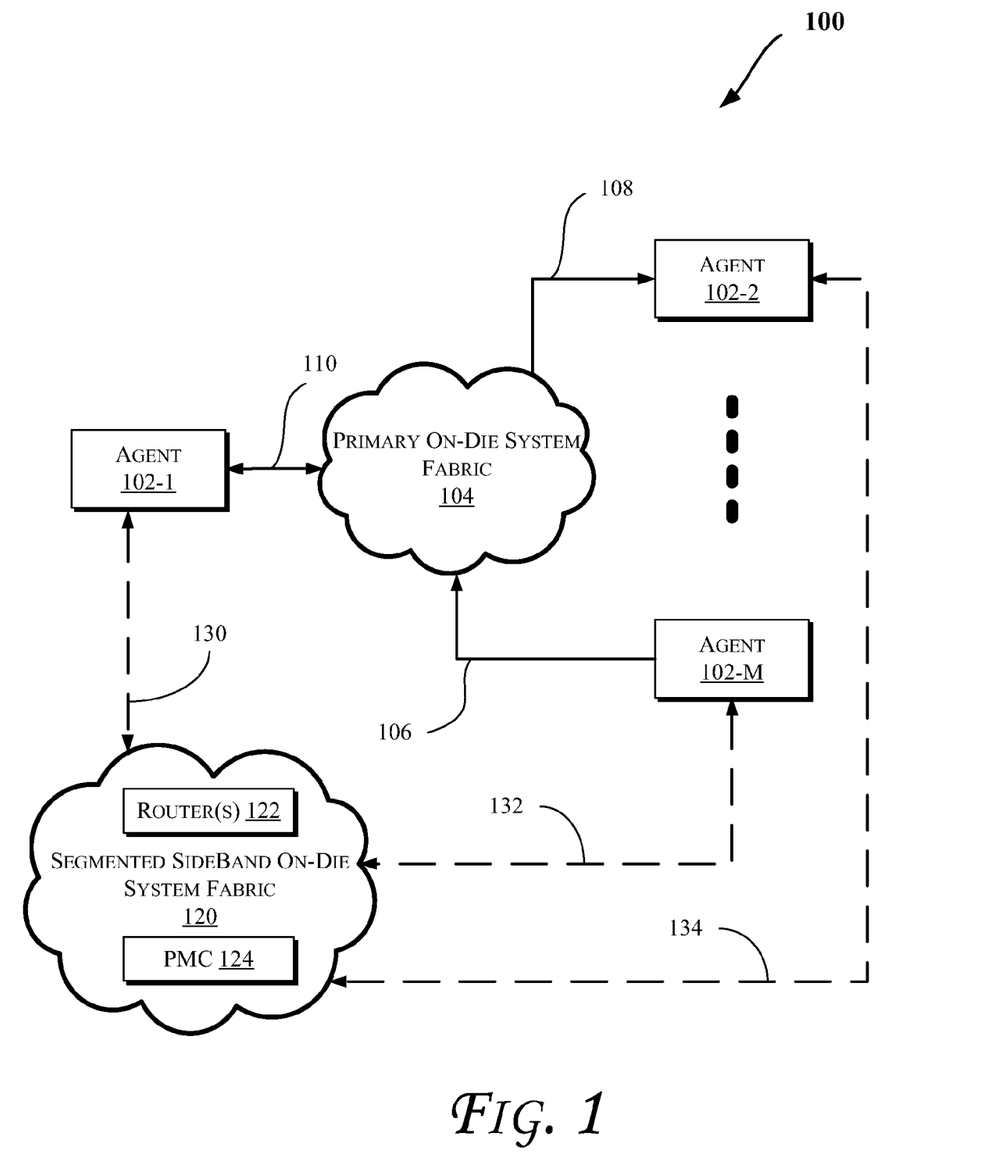
FIGS. 1 and 4-5 illustrate block diagrams of embodiments of computing systems, which may be utilized to implement various embodiments discussed herein.

Techniques discussed herein may be applied in various computing systems, such as those discussed with reference to FIGS. 1 and 4-5. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, one or more of the agents 102 may be any of components of a computing system, such as the computing systems discussed with reference to FIGS. 4-5.

As illustrated in FIG. 1, the agents 102 may communicate via a primary fabric 104, such as an OSF. Hence, agents 102 and fabric 104 may be present on the same integrated circuit die in an embodiment. As discussed herein, "OSF" may refer to an On-Die System Fabric which is scalable, configurable, and/or product specific. For example, each of the agents 102 may be a bridge (e.g., for coupling to another fabric), IP block, or another component of an electronic device which are coupled via the fabric 104. In one embodiment, the fabric 104 may include a computer network that allows various agents (such as computing devices) to communicate data. In an embodiment, the fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the fabric 104 may provide communication that adheres to one or more cache coherent protocols. Alternatively, fabric 104 may adhere to non-coherent protocols.

Furthermore, as shown by the direction of arrows in FIG. 1, the agents 102 may transmit and/or receive data via the fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110). In some embodiments, links 106-110 may be OSF interfaces that provide protocol and/or signaling to allow IP blocks to interoperate across multiple designs.

In an embodiment, OSF interfaces that couple the agents 102 (e.g., links 106-110) may provide two ports referred to as primary channel and sideband channel. The primary channel may: (a) be a high performance interface for data transfer between peers and/or upstream; (b) support memory (e.g., 32 bit, 44 bit), input/output (IO), configuration, and message transactions; (c) support Peripheral Component Interconnect (PCI) ordering rules and/or enumeration; (d) support split transaction protocol; and/or (e) maps PCIe header information. The sideband channel may: (i) provide a standard interface to communicate sideband (also referred to herein interchangeable as "out-of-band") information and eliminate special purpose wires; (ii) provide a point-to-point network; (iii) be used for status, power management, configuration shadowing, test modes, etc.; and/or (iv) be used for low performance (e.g., not intended for primary data transfers). As discussed herein, Peripheral Component Interconnect (PCI) Express ("PCIe") may be in accordance with PCI Express Base Specification 3.0, Revision 0.5, August 2008.

As shown in FIG. 1, the sideband channel may be provided through a segmented sideband OSF 120, in some embodiments. The sideband OSF 120 may include one or more routers 122 that facilitate communication of out-of-band messages between two or more agents 102 via interfaces 130, 132, and 134. Interfaces 130, 132, and 134 may be implemented as point-to-point links. Also, the point-to-point links may be bidirectional or unidirectional (e.g., with one unidirectional link dedicated to transmit and another dedicated to receipt of messages). In some embodiments, the sideband OSF 120 may be may be segmented into a plurality of segments. Each of these segments may be located in a separate power domain. In an embodiment, there may be three power domains. Each segment may include one or more OSF sideband router(s) 122.

Resetting and then powering down any sideband segment may cause the whole sideband network to hang or malfunction, especially when there is a message is in progress of transfer to/from a segment. Generally, a message is considered to be in progress if:

(1) End (last flit, where a "flit" refers to a flow control unit or fundamental transfer size used in the sideband message channel to transfer payload data) of any message has not been put onto sideband fabric yet, or has been put onto sideband but has yet to be consumed by target endpoint/agent.

(2) Completion message of a non-posted message has not reached or been consumed by the non-posted message initiator.

(3) Posted Request—Posted Acknowledge handshake between a pair of endpoints has been kick-started, and the Posted Acknowledge message has yet to reach or consumed by the handshake initiator.

Generally, the OSF interface (e.g., primary OSF 104 and secondary OSF 120 of FIG. 1) supports three basic request types: posted, non-posted and completions. Posted requests do not require a completion and thus the transaction is completed first at sender before receiver. Non-posted requests require a completion to return the data or status requested, and thus the transaction is completed last at sender after receiver. In some embodiments, decoupling the read requests from the read data response allows the interface to optimize the available resources.

Figure 2:
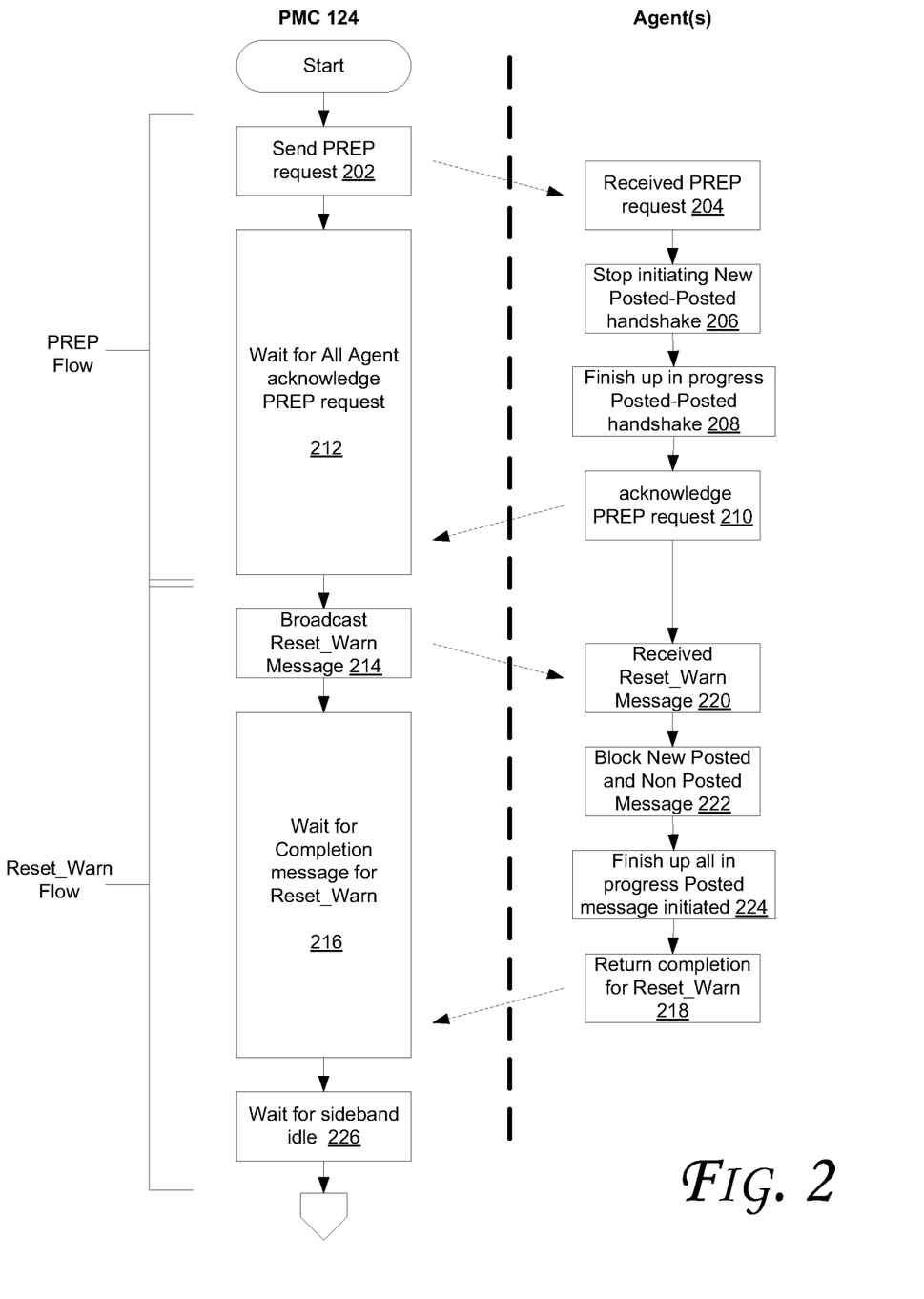
FIGS. 2 and 3 illustrate flow diagrams of methods, according to some embodiments.
Figure 3:
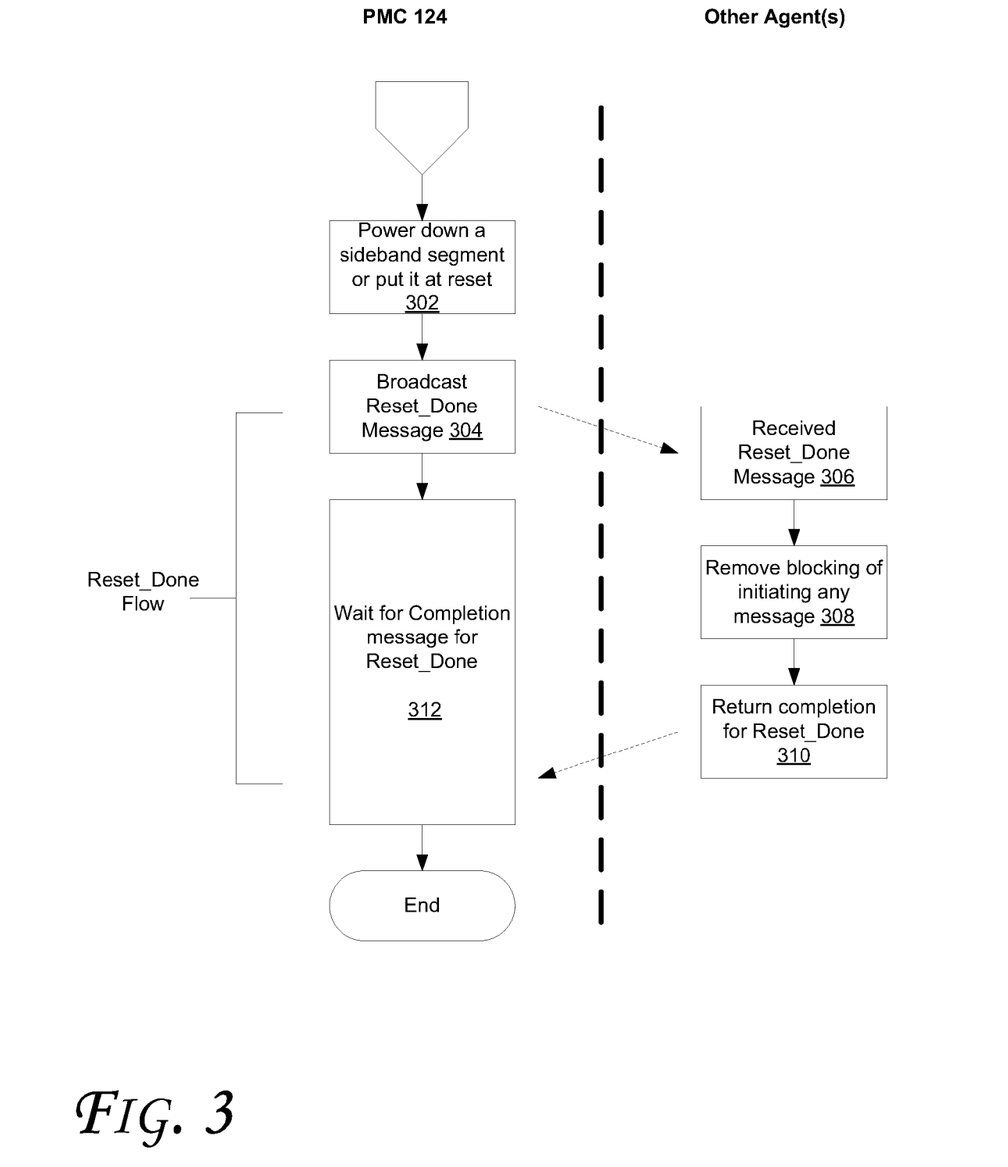

FIGS. 2-3 illustrate flow diagrams to manage sideband segments in an On-die System Fabric (OSF), according to some embodiments. In one embodiment, all in progress message in the sideband OSF are handled and the whole sideband network is entered into an idle state before resetting a sideband segment.

As shown in FIGS. 2-3, a PREP and a reset Warn flow are provided for the sideband network. These are in addition to host partition warm reset without power cycling, Sx transition (which refers to CORE Well Power State transition), and Mx transition (which refers to Manageability Engine power state transition, which involves ASW Well Power State transition). Completion of PREP flow on sideband network is a pre-requisition for Reset Warn flow on sideband network. Completion of Reset Warn flow on sideband network is a pre-requisition for any system reset flow to reset a sideband segment (where the latter is shown in FIG. 3).

As discussed herein, PREP refers to a flow used to ensure all Posted-Posted hand-shake on OSF sideband is finished before sideband enters reset. Referring to FIG. 2, a Power Management Controller (PMC) logic 124 (that may be provided in the segmented OSF 120 as shown in FIG. 1, or alternatively elsewhere in the system) kick starts PREP flow by asserting PREP_REQ signal at 202 (may be direct wire or point-to-point message on sideband OSF) to endpoints that may participate in Posted-Posted hand-shake on OSF sideband. An endpoint, who has initiated Posted Request when receiving PREP_REQ assertion at 204, stops initiating new Posted Request at 206 and wait for respective Posted Acknowledge at 208 before asserting PREP_ACK signal at 210 (may be direct wire or point-to-point message on OSF sideband) to PMC 124. The PREP flow ends at 212 after receiving the PREP acknowledge signal from 210.

The reset Warn Flow on sideband (we named it SBI (SideBand Interface) reset warn flow), involve handshake between Power Management Controller (PMC) 124 and the sideband world. PMC, who is an OSF sideband agent, may act as an initiator of SBI reset warn flow. To kick start the flow, PMC broadcast a RESET_WARN non-posted message onto sideband network at 214. When PMC received completion to this Reset_Warn message at 216 from 218, all endpoints have committed to not initiating new cycle, by receiving the reset_Warn message at 220, block new posted and non-posted messages at 222, finishing up all in-progress posted messages initiated at 224, and returning completion for reset_warn at 218.

As illustrated in FIG. 1, PMC 124 waits for any other message in flight to finish up at 226. Every router may assert its own router_idle signal when all message has been flushed out from internal queue or FIFO (First-In, First-Out) and endpoints attached to it are having Agent_ISM==IDLE. Every Endpoint's Agent_ISM may only move to IDLE after end (last flit) of message initiated has been flushed out from internal queue/FIFO, and completion message for all initiated non posted message, if any, has been returned, in accordance with one embodiment.

When all routers have asserted router_idle, PMC considers this state as no more message being in flight, i.e., OSF sideband is totally quite. Receiving of Reset_Warn message completion and assertion of all router_idle marks the end of SBI reset warn flow, and PMC may now proceed with system reset flow that will reset one or more sideband segment as shown in FIG. 3.

In an embodiment, an endpoint receiving Reset_Warn message shall return completion to Reset_Warn based on following rules:

1. Once Reset_Warn is captured, stop initiating new posted (except completion) and new non-posted message.

2. Finish up all in progress posted (not completion) message initiated by its agent before returning completion to RESET_WARN.

3. Do not wait for in progress non-posted message initiated by agent to be finished before returning completion to RESET_WARN msg. One reason for this is that: waiting for non-posted before sending a completion will create IN-OUT dependency, which may cause deadlock.

4. Agent that initiated non-posted message keeps endpoint's Agent_ISM at ACTIVE state until completion for all non-posted message initiated are captured 5. When agent captures Reset_Warn message, agent allows receiving of incoming message on endpoint target interface as normal. When endpoint initiated Reset_Warn completion message, it is possible that there are still message targeting to this endpoint. Reset_Warn flow does not restrict this endpoint's AGENT_ISM from transition out of IDLE in order to receive the incoming message.

Referring to FIG. 3, PMC powers down a sideband segment or puts it at rest at 302. At the end of SBI reset warn flow of FIG. 2, sideband remains quite until PMC initiates Reset_Done broadcast message at 304. PMC may initiate Reset_Done message when a system reset flow has reset or powered down a sideband segment. Agent who does not have its endpoint reside in the segment that has been powered down or reset receives this Reset_Done non-posted message at 306. After Reset_Done is received, these agents shall remove any blocking of initiating new message at 308. The agents then return completion for Reset_Done at 310. The PMC 124 waits for completion message for Reset_Done at 312 before the flow is ended.

In various embodiments, Reset_Warn and Reset_Done may be implemented as direct wire or message on OSF sideband. Additionally, each endpoint and router may implement Idle State Machine (ISM) on OSF sideband 120 interface. Having all endpoints' agent_ism==IDLE and all routers' fabric_ism==IDLE as a condition to reset a segment is insufficient, a master endpoint may kick start a new cycle 1 clock after this condition has been met. Hence, the whole sideband network needs to be kept in quiescent before resetting any segment.

After powering down a sideband segment, other segments that remain powered ON would need to be able to exit from quiescent state. To this end, an embodiment provides techniques to quite down the sideband network for resetting and powering down of the sideband network, without losing the functionality of sideband fabrics/networks that remain ON.

In some embodiments, sideband segment in CORE well will go thru power state changes in Sx transition, sideband segment in ASW well will go thru power state changes in Mx transition, and sideband segment in SUS well will be ON all the time. In the case of host partition warm reset (without power cycling), CORE well sideband segment may go thru reset cycle without power state changes. The same requirement of quite down the whole sideband network is applicable in this case. Thus, some embodiments are able to reset sideband network according to power hierarchy gracefully.

Various types of computing systems may be used to implement the embodiments discussed herein (such as those discussed with reference to FIGS. 1-3). For example, FIG. 4 illustrates a block diagram of an embodiment of a computing system 400. One or more of the agents 102 of FIG. 1 may comprise one or more components of the computing system 400. The computing system 400 may include one or more central processing unit(s) (CPUs) 402 (which may be collectively referred to herein as "processors 402" or more generically "processor 402") coupled to an interconnection network (or bus) 404. The processors 402 may be any type of processor such as a general purpose processor, a network processor (which may process data communicated over a computer network 405), etc. (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors.

The processor 402 may include one or more caches and/or Memory Management Units (MMUs, not shown). The caches may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 2 (L2) cache, a level 3 (L3) cache, a mid-level cache, a last level cache (LLC), etc. to store electronic data (e.g., including instructions) that is utilized by one or more components of the system 400.

Figure 4:
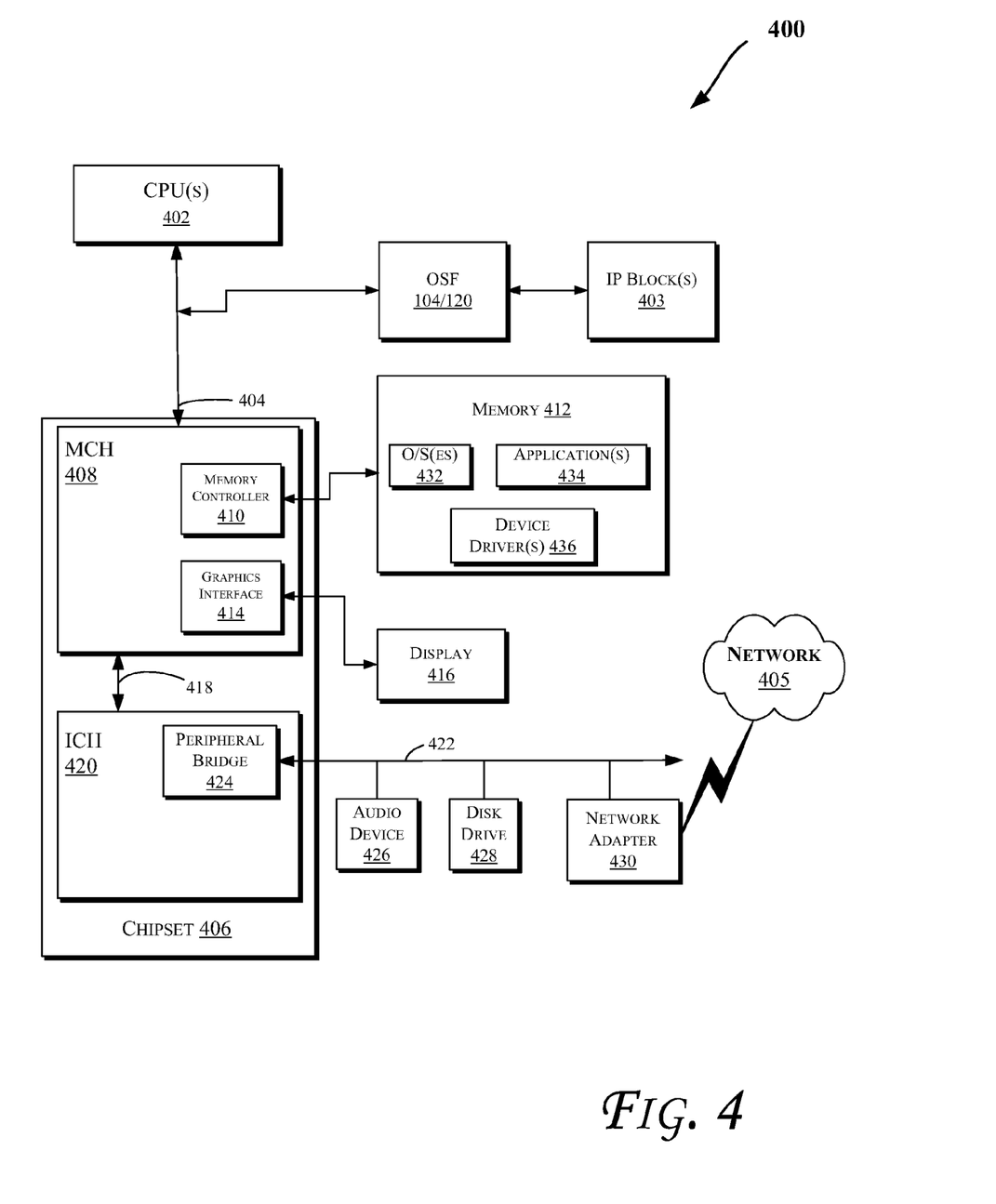

As shown in FIG. 4, the OSFs 104/120 may be coupled between one or more IP blocks 403 and the processor(s) 402 (e.g., through the interconnect 404). As discussed with reference to FIGS. 1-3, the sideband OSF 120 may be segmented and may include logic (e.g., PMC 124) to facilitate power management in multiple domains of the sideband OSF 120.

A chipset 406 may additionally be coupled to the interconnection network 404. Further, the chipset 406 may include a memory control hub (MCH) 408. The MCH 408 may include a memory controller 410 that is coupled to a memory 412. The memory 412 may store data, e.g., including sequences of instructions that are executed by the processor 402, or any other device in communication with components of the computing system 400. In an embodiment, the memory 412 may be used to store data such as discussed with reference to FIGS. 1-3 (such as a page table). Also, in one embodiment of the invention, the memory 412 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 404, such as multiple processors and/or multiple system memories.

The MCH 408 may further include a graphics interface 414 coupled to a display device 416 (e.g., via a graphics accelerator in an embodiment). In one embodiment, the graphics interface 414 may be coupled to the display device 416 via an accelerated graphics port (AGP). In an embodiment of the invention, the display device 416 (such as a flat panel display) may be coupled to the graphics interface 414 through, for example, a signal converter that translates a digital representation of an image stored in a storage device such as video memory or system memory (e.g., memory 412) into display signals that are interpreted and displayed by the display 416.

As shown in FIG. 4, a hub interface 418 may couple the MCH 408 to an input/output control hub (ICH) 420. The ICH 420 may provide an interface to input/output (I/O or IO)

devices coupled to the computing system 400. The ICH 420 may be coupled to a bus 422 through a peripheral bridge (or controller) 424, such as a peripheral component interconnect (PCI) bridge that may be compliant with the PCIe specification, a universal serial bus (USB) controller, etc. The bridge 424 may provide a data path between the processor 402 and peripheral devices. Other types of topologies may be utilized. Also, multiple buses may be coupled to the ICH 420, e.g., through multiple bridges or controllers. For example, the bus 422 may comply with the PCI Local Bus Specification, Revision 3.0, 2004, available from the PCI Special Interest Group, Portland, Oreg., U.S.A. (hereinafter referred to as a "PCI bus"). Alternatively, the bus 422 may comprise a bus that complies with the PCI-X Specification Rev. 3.0a, 2003 (hereinafter referred to as a "PCI-X bus") and/or PCI Express (PCIe) Specifications (PCIe Specification, Revision 2.0, 2006), available from the aforementioned PCI Special Interest Group, Portland, Oreg., U.S.A. Further, the bus 422 may comprise other types and configurations of bus systems. Moreover, other peripherals coupled to the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 422 may be coupled to an audio device 426, one or more disk drive(s) 428, and a network adapter 430 (which may be a NIC in an embodiment). In one embodiment, the network adapter 430 or other devices coupled to the bus 422 may communicate with the chipset 406 via the switching logic 412 (which may be the same or similar to the logic 412 of FIG. 4 in some embodiments). Other devices may be coupled to the bus 422. Also, various components (such as the network adapter 430) may be coupled to the MCH 408 in some embodiments of the invention. In addition, the processor 402 and the MCH 408 may be combined to form a single chip.

Additionally, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 412 may include one or more of the following in an embodiment: an operating system (O/S) 432, application 434, and/or device driver 436 (such as the OS, application(s), and/or device drivers). The memory 412 may also include regions dedicated to MMIO operations. Programs and/or data stored in the memory 412 may be swapped into the disk drive 428 as part of memory management operations. The application(s) 434 may execute (e.g., on the processor(s) 402) to communicate one or more packets with one or more computing devices coupled to the network 405. In an embodiment, a packet may be a sequence of one or more symbols and/or values that may be encoded by one or more electrical signals transmitted from at least one sender to at least on receiver (e.g., over a network such as the network 405). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 405).

In an embodiment, the application 434 may utilize the O/S 432 to communicate with various components of the system 400, e.g., through the device driver 436. Hence, the device driver 436 may include network adapter 430 specific commands to provide a communication interface between the O/S 432 and the network adapter 430, or other I/O devices coupled to the system 400, e.g., via the chipset 406.

In an embodiment, the O/S 432 may include a network protocol stack. A protocol stack generally refers to a set of procedures or programs that may be executed to process packets sent over a network 405, where the packets may conform to a specified protocol. For example, TCP/IP (Transport Control Protocol/Internet Protocol) packets may be processed using a TCP/IP stack. The device driver 436 may indicate the buffers 438 that are to be processed, e.g., via the protocol stack.

The network 405 may include any type of computer network. The network adapter 430 may further include a direct memory access (DMA) engine 452, which writes packets to buffers (e.g., stored in the memory 412) assigned to available descriptors (e.g., stored in the memory 412) to transmit and/or receive data over the network 405.

Figure 5:
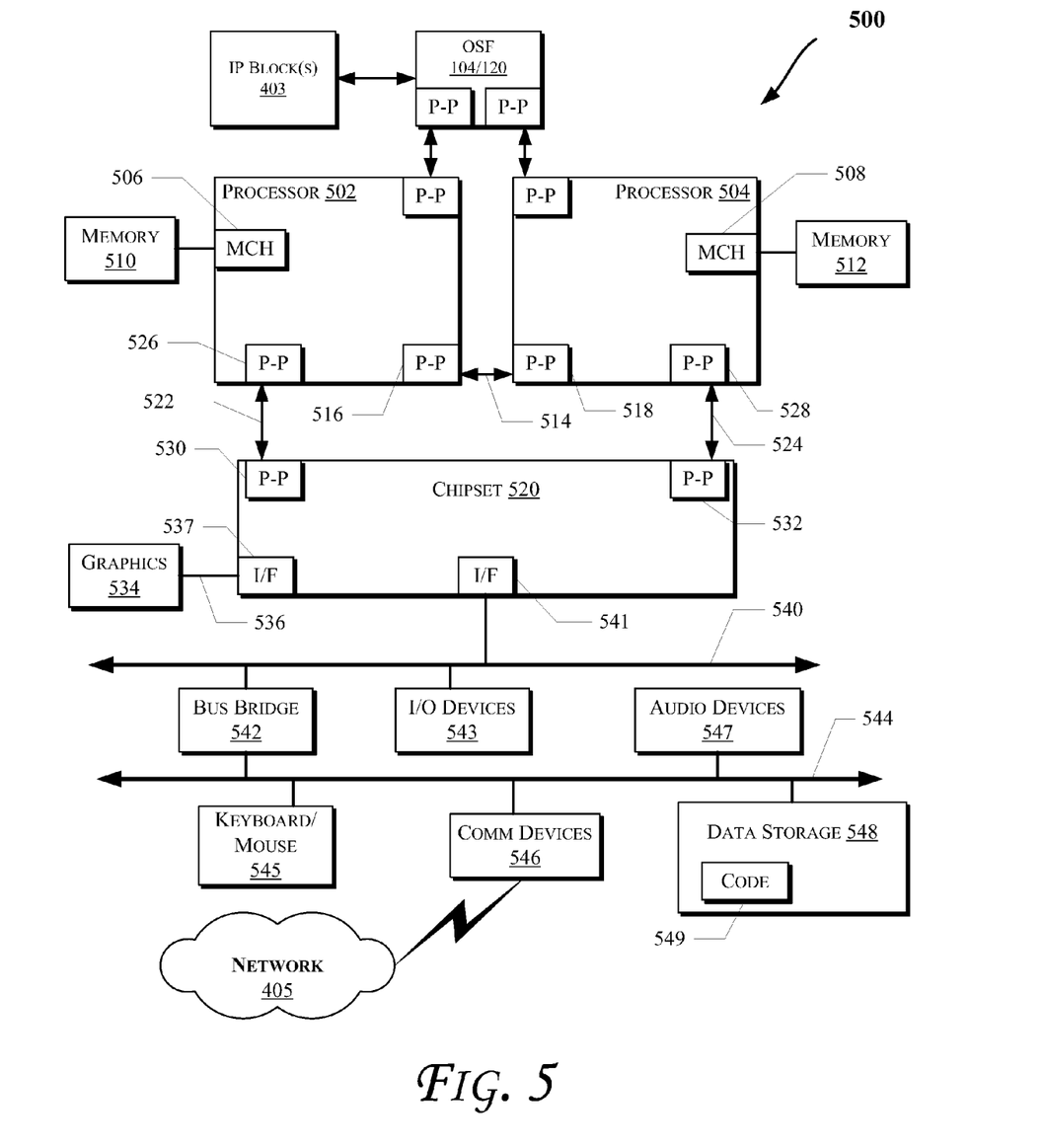

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512 (which may store MMIO regions). The memories 510 and/or 512 may store various data such as those discussed with reference to the memory 412 of FIG. 4. As shown in FIG. 5, the processors 502 and 504 may also include one or more cache(s) such as those discussed with reference to FIG. 4.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537.

In at least one embodiment, the OSFs 104/120 may couple the processors 502, 504 (through PtP interfaces, for example) to one or more IP blocks 403. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5. Also, processor(s) 502, 504 may include MMU(s). Further, OSF 104/120 may be located elsewhere in system 500, such as within chipset 520, communication device(s) 546, devices coupled to bus 540/744, etc.

The chipset 520 may communicate with the bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 405), audio I/O device, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The (e.g., non-transitory) machine-readable medium may include a storage device such as those discussed with respect to FIGS. 1-5. Additionally, such computer-readable media may be downloaded as a computer program product, wherein the program may be transferred from a remote computer (e.g., a server) to a requesting computer (e.g., a client) through data signals provided in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An integrated circuit comprising:
a sideband On-die System Fabric (OSF) to couple a first agent and a second agent, wherein the sideband OSF is to allow the first agent and the second agent to communicate out-of-band information via one or more routers; and
power management logic to initiate a request to reset a segment of a plurality of segments of the sideband OSF, wherein each segment of the plurality of segments is to be located in a separate power domain, wherein each segment of the plurality of segments is to include at least one of the one or more routers,
wherein the power management logic is to cause the segment to reset in response to an acknowledgement from one or more agents in the segment of the plurality of segments that the one or more agents have handled all in-progress posted messages, wherein the separate power domain is to comprise a chipset suspend power domain, wherein the chipset suspend power domain is to comprise the power management logic, wherein the one or more agents are to block new posted and non-posted messages in response to a broadcast message from the power management logic, wherein the one or more agents are to finish in-progress posted-posted handshake messages in response to a message from the power management logic.

2. The integrated circuit of claim 1, wherein the one or more agents are to finish all in-progress posted messages in response to a message from the power management logic.

3. The integrated circuit of claim 1, wherein the power management logic is to wait for a sideband idle state prior to causing the segment to reset.

4. The integrated circuit of claim 1, wherein the one or more agents are to stop initiating new posted-posted handshake messages in response to a message from the power management logic.

5. The integrated circuit of claim 1, wherein at least one agent in a different segment of the plurality of segments is to remove blocking of initiating of any message in response to a message from the power management logic that indicates the segment is reset.

6. The integrated circuit of claim 1, wherein the first agent is to comprise a processor.

7. The integrated circuit of claim 6, wherein the processor is to comprise one or more processor cores.

8. The integrated circuit of claim 1, wherein the second agent is to comprise a logic block.

9. A method comprising:
routing one or more out-of-bank messages between a first agent and a second agent via a sideband On-die System Fabric (OSF); and
initiating a request to reset a segment of a plurality of segments of the sideband OSF, wherein each segment of the plurality of segments is located in a separate power domain, wherein each segment of the plurality of segments includes one or more routers,
wherein the segment is to reset in response to an acknowledgement from one or more agents in the segment of the plurality of segments that the one or more agents have handled all in-progress posted messages, wherein the separate power domain comprises a chipset suspend power domain, wherein the chipset suspend power domain comprises power management logic that initiates the request to reset the segment of the plurality of segments of the sideband wherein the one or more agents block new posted and non-posted messages in response to a broadcast message from the power management logic, wherein the one or more agents finish in-progress posted-posted handshake messages in response to a message from the power management logic.

10. The method of claim 9, further comprising the one or more agents finishing all in-progress posted messages in response to a message from a power management logic.

11. The method of claim 9, further comprising waiting for a sideband idle state prior to causing the segment to reset.

12. The method of claim 9, further comprising the one or more agents stopping initiation of new posted-posted handshake messages in response to a message from a power management logic.

13. A system comprising:
an input/output (IO) device;
a sideband On-die System Fabric (OSF) to couple a processor to the IO device; and
power management logic to initiate a request to reset a segment of a plurality of segments of the sideband OSF, wherein each segment of the plurality of segments is to be located in a separate power domain, wherein each segment of the plurality of segments is to include one or more routers,
wherein the power management logic is to cause the segment to reset in response to an acknowledgement from one or more agents in the segment of the plurality of segments that the one or more agents have handled all in-progress posted messages, wherein the separate power domain is to comprise a chipset suspend power domain, wherein the chipset suspend power domain is to comprise the power management logic, wherein the one or more agents are to block new posted and non-posted messages in response to a broadcast message from the power management logic, wherein the one or more agents are to finish in-progress posted-posted handshake messages in response to a message from the power management logic.

14. The system of claim 13, wherein the one or more agents are to finish all in-progress posted messages in response to a message from the power management logic.

15. The system of claim 13, wherein the power management logic is to wait for a sideband idle state prior to causing the segment to reset.

16. The system of claim 13, wherein the one or more agents are to stop initiating new posted-posted handshake messages in response to a message from the power management logic.

17. The integrated circuit of claim 1, wherein the power management logic is to facilitate power management across the plurality of segments of the sideband OSF.

18. The integrated circuit of claim 1, wherein the separate power domain is one of: the chipset suspend power domain, an auxiliary power domain, or a chipset core power domain.

19. The integrated circuit of claim 18, wherein the auxiliary power domain is to comprise chipset manageability engine to support power state transition.

20. The integrated circuit of claim 18, wherein the chipset core power domain is to comprise chipset core logic.

* * * * *

UNITED STATES PATENT AND TRADEMARK OFFICE
CERTIFICATE OF CORRECTION

| | |
|---|---|
| PATENT NO. | : 9,489,028 B2 |
| APPLICATION NO. | : 13/631870 |
| DATED | : November 8, 2016 |
| INVENTOR(S) | : Khor et al. |

It is certified that error appears in the above-identified patent and that said Letters Patent is hereby corrected as shown below:

In the Claims

In Column 10, in Line 52 insert -- OSF, -- after segments of the sideband

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*